*US011060590B2*

(12) United States Patent
Boyum et al.

(10) Patent No.: US 11,060,590 B2
(45) Date of Patent: Jul. 13, 2021

(54) SCANNING DEVICE WITH BELT TENSIONING SYSTEM MOUNTED ON A PLATE OF A SCAN BAR HAVING AT LEAST PULLEY AND SPRING COUPLED TO FIRST AND SECOND PLANARS OF THE PLATE

(71) Applicant: Hewlett-Packard Development Company, L.P., Spring, TX (US)

(72) Inventors: Gerald Boyum, Vancouver, WA (US); Matthew Douglas Reier, Vancouver, WA (US); Kevin Lo, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/332,047

(22) PCT Filed: Sep. 12, 2016

(86) PCT No.: PCT/US2016/051237
§ 371 (c)(1),
(2) Date: Mar. 11, 2019

(87) PCT Pub. No.: WO2018/048434
PCT Pub. Date: Mar. 15, 2018

(65) Prior Publication Data
US 2019/0226559 A1    Jul. 25, 2019

(51) Int. Cl.
*F16H 7/14*    (2006.01)
*H04N 1/04*    (2006.01)
(Continued)

(52) U.S. Cl.
CPC ............... *F16H 7/14* (2013.01); *F16H 7/02* (2013.01); *H04N 1/00525* (2013.01); *H04N 1/00559* (2013.01); *H04N 1/04* (2013.01); *H04N 1/10* (2013.01); *H04N 1/1061* (2013.01); *H04N 1/193* (2013.01); *A01D 41/1274* (2013.01);
(Continued)

(58) Field of Classification Search
None
See application file for complete search history.

(56) References Cited

U.S. PATENT DOCUMENTS 4,571,221 A * 2/1986 Isobe .................... F16H 7/14
474/101
4,777,533 A * 10/1988 Watanabe .............. B41J 32/00
358/476
(Continued)

FOREIGN PATENT DOCUMENTS

CN    204143465 U    2/2015
EP    1536159 A2    6/2005
(Continued)

*Primary Examiner* — Haris Sabah
(74) *Attorney, Agent, or Firm* — Tong Rea Bentley & Kim LLC

(57) ABSTRACT

In one example, an apparatus includes a plate configured to pivot about a pivot point, a pulley coupled to a first planar side of the plate and configured to rotate a belt, a motor coupled to the first planar side of the plate and configured to drive the pulley, and a torsion spring coupled to a second planar side of the plate that is opposite the first planar side and configured to apply tension to the belt.

10 Claims, 5 Drawing Sheets

(51) Int. Cl.
*H04N 1/10* (2006.01)
*F16H 7/02* (2006.01)
*H04N 1/00* (2006.01)
*H04N 1/193* (2006.01)
*H04N 1/034* (2006.01)
*G06K 15/22* (2006.01)
*G03G 15/00* (2006.01)
*G03G 15/08* (2006.01)
*A01D 41/127* (2006.01)
*F16H 7/08* (2006.01)

(52) U.S. Cl.
CPC ............... *F16H 2007/081* (2013.01); *F16H 2007/0865* (2013.01); *F16H 2007/0893* (2013.01); *F16H 2007/0895* (2013.01); *G03G 15/0808* (2013.01); *G03G 15/754* (2013.01); *G03G 15/758* (2013.01); *G06K 15/225* (2013.01); *H04N 1/034* (2013.01); *H04N 2201/0081* (2013.01); *H04N 2201/0094* (2013.01)

(56) References Cited

U.S. PATENT DOCUMENTS

| | | | |
|---|---|---|---|
| 4,779,141 A * | 10/1988 | Watanabe | H04N 1/1017 347/263 |
| 4,868,672 A * | 9/1989 | Hiroki | H04N 1/00588 358/494 |
| 5,816,969 A | 10/1998 | Tsai | |
| 6,254,080 B1 * | 7/2001 | Bass | B65H 3/0684 271/10.11 |
| 6,377,364 B1 | 4/2002 | Short et al. | |
| 6,966,554 B2 | 11/2005 | Panini et al. | |
| 7,090,604 B2 | 8/2006 | Lin | |
| 2003/0047424 A1 * | 3/2003 | Monahan | B65G 39/16 198/806 |
| 2004/0174573 A1 | 9/2004 | Hayashi | |
| 2005/0113197 A1 | 5/2005 | Pong | |
| 2006/0181752 A1 | 8/2006 | Chang | |
| 2007/0129189 A1 | 6/2007 | Huang et al. | |
| 2007/0145311 A1 * | 6/2007 | Price | G03B 42/045 250/584 |
| 2009/0078543 A1 * | 3/2009 | Shoji | G03G 15/0131 198/813 |
| 2009/0209379 A1 * | 8/2009 | Nichols, Jr. | B27C 7/00 474/112 |
| 2011/0065540 A1 | 3/2011 | Su et al. | |
| 2016/0006899 A1 * | 1/2016 | Kang | H04N 1/00551 358/474 |

FOREIGN PATENT DOCUMENTS

| | | |
|---|---|---|
| RU | 1620876 A1 | 1/1991 |
| RU | 1809206 A1 | 4/1993 |
| WO | WO-2009125262 A1 | 10/2009 |

* cited by examiner

SCANNING DEVICE WITH BELT TENSIONING SYSTEM MOUNTED ON A PLATE OF A SCAN BAR HAVING AT LEAST PULLEY AND SPRING COUPLED TO FIRST AND SECOND PLANARS OF THE PLATE

BACKGROUND

Scanning devices, including multifunction printers (MFPs) and other devices, often place a document to be scanned on a transparent window for scanning. The document may be placed, face down (i.e., where "face" refers to the side of the document to be scanned) on one side of the window. A scan bar including optics for scanning the document may then then moved along the length of the opposite side of the window, e.g., along a carriage rod. The scan bar may be propelled along the carriage rod by a drive mechanism that includes a motor and a flexible belt.

DETAILED DESCRIPTION

In one example, the present disclosure describes a belt tensioning system for use in a scanning device. As discussed above, the drive mechanism that is used to propel a scan bar when scanning a document may include a motor and a flexible belt. A tensioning system may be used to apply a constant force that maintains the proper amount of tension in the belt. In some configurations, the motor and the tensioning system may be placed on opposite ends of the carriage rod, causing the motor and the tensioning system to pull in opposite directions. Although the tension applied to the belt may be increased to keep the motor and the tensioning system in balance, this causes the tensioning system and the motor to work harder, and therefore accelerates the wear on both. It also increases the noise emitted by the scanning device due to the vibrations of the motor and the tensioning system pulling in opposite directions.

Examples of the present disclosure describe a belt tensioning system that is mounted directly to the mounting plate (or drive plate) of the motor. The motor and the tensioning system pull in the same direction, making the force exerted on the belt by the tensioning system additive when the motor exerts force to move the scan bar. Because the tension exerted on the belt can be reduced in this configuration, wear on the motor and the tensioning system can likewise be reduced. Moreover, because the motor and the tensioning system are no longer pulling in opposite directions, the vibrations of the motor and the tensioning system are reduced, thereby reducing the overall noise emitted by the scanning device.

Figure 1:
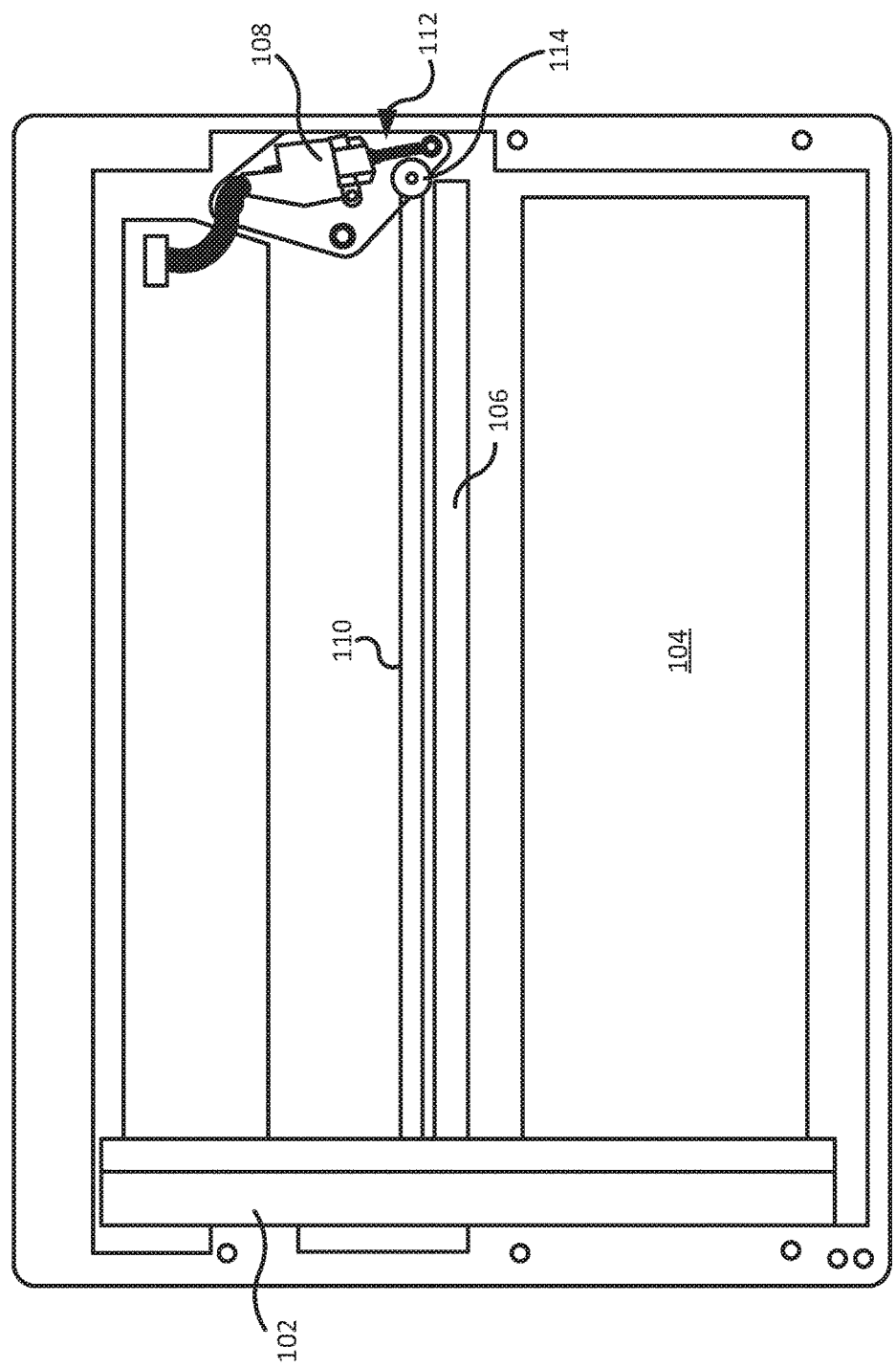
FIG. 1 illustrates a first example of a portion of a drive mechanism for driving a scan bar of a scanning device.

FIG. 1 illustrates a first example of a portion of a drive mechanism 100 for driving a scan bar 102 of a scanning device. In particular, FIG. 1 illustrates a view of the drive mechanism 100 from the underside of a window 104 of the scanning device (e.g., the surface upon which a document is placed for scanning). Thus, the window 104 may be generally rectangular in shape, with various components of the drive mechanism 100 located on the periphery of the rectangle. The scan bar 102 houses various optics for scanning a document, including, for example, one or more light sources (e.g., light emitting diodes), lenses, sensors (e.g., photodetectors), and the like.

As illustrated, the drive mechanism 100 for driving the scan bar 102 generally comprises a carriage rod 106, a motor 108, a belt 110, and a belt tensioner 112.

In one example, the carriage rod 106 comprises a generally linear rod or shaft that extends along the length of the window 104 and on which the scan bar 102 is mounted. The scan bar 102 may move back and forth along the length of the carriage rod 106 (e.g., from left to right and right to left in FIG. 1) in order to scan a document that is placed on the opposite side of the window 104. For instance, the scan bar 102 may move in one direction to scan the document, and then move in the opposite direction to return to its starting position (e.g., so that it is ready to scan a next document). Alternatively, the scan bar 102 may complete a scan of a document in two passes, moving first in one direction and then in the opposite direction in order to generate sufficient data to reproduce the document.

In one example, the belt 110 comprises a loop of an elastic material. The belt 110 may be positioned in a substantially parallel orientation relative to the carriage rod 106; thus, the belt 110 may extend across the length of the window 104. The belt 110 may be supported on a set of pulleys, where at least one pulley is mounted near each end of the carriage rod. For instance, in the example illustrated in FIG. 1, a first pulley 114 is mounted near one end of the carriage rod 106, while another pulley (obscured by the scan bar 102 in FIG. 1) is mounted near the opposite end of the carriage rod 106. The scan bar 102 is mounted to the belt 110, such that when the belt 110 is rotated by the set of pulleys, the scan bar 102 is driven along the carriage rod 106.

In one example, the motor 108 is mounted near one end of the carriage rod 106. The motor 108 urges the set of pulleys into motion, which thereby rotates the belt 110 and drives the scan bar 102 along the carriage rod. In the example illustrated in FIG. 1, the motor 108 exerts a force that pulls the belt 110 toward the motor 108 (e.g., to the right of the figure).

In one example, the belt tensioner 112 is mounted in a location near the motor 108 (e.g., to an underside of the motor's mounting plate). The belt tensioner 112 exerts a constant force on the belt 110 that maintains the proper amount of tension in the belt 110. In the example illustrated in FIG. 1, the belt tensioner 112 exerts a force that pulls the belt 110 toward the belt tensioner 112 (e.g., to the right of the figure). Thus, the motor 108 and the belt tensioner 112 act on the belt 110 in the same direction.

Figure 2A:
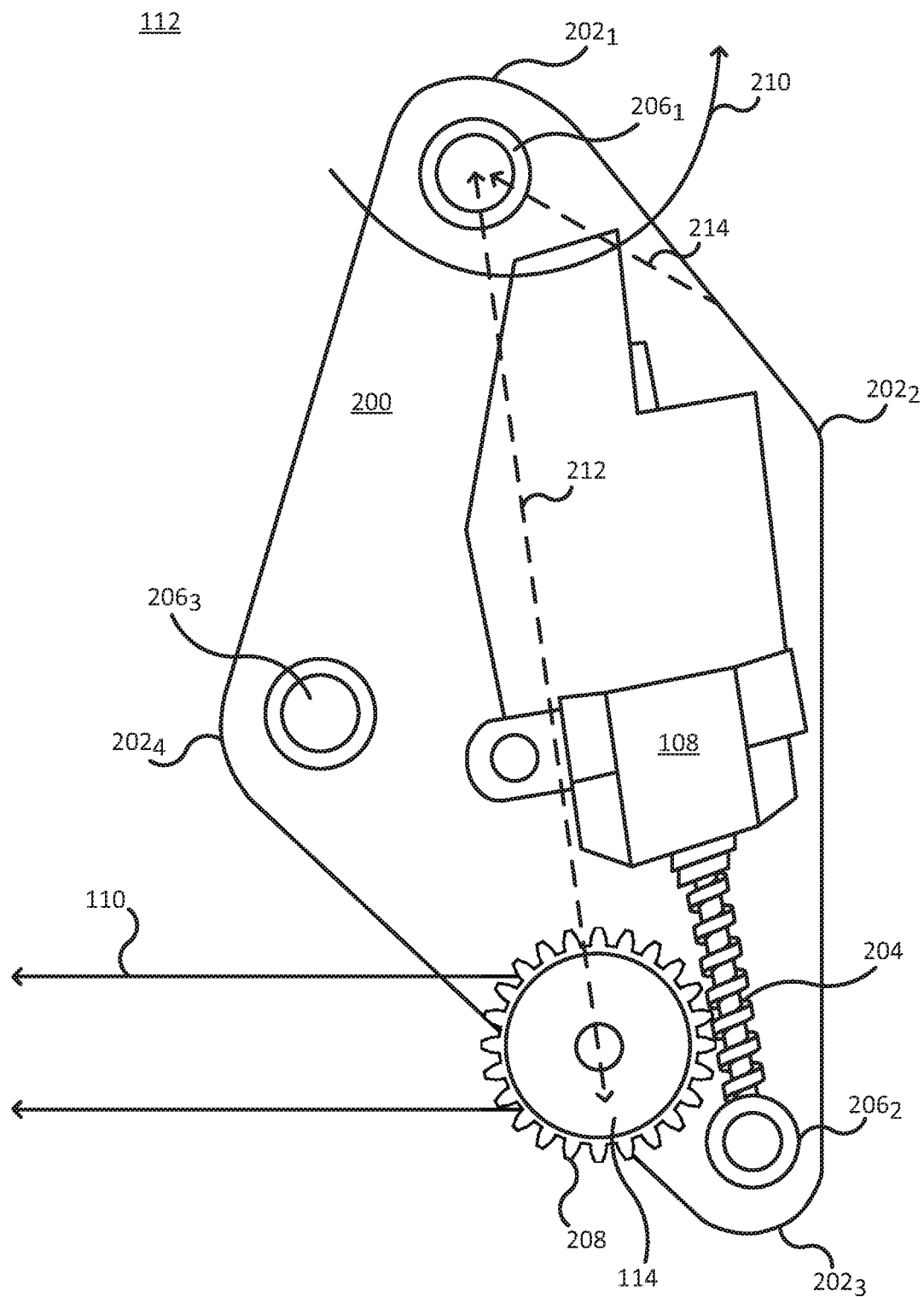
FIG. 2A illustrates a more detailed view of a first example of the motor and assembly of FIG. 1.

FIG. 2A illustrates a more detailed view of a first example of the motor 108 and assembly of FIG. 1. In particular, FIG. 2A illustrates a top view of the motor 108 and assembly (i.e., a view of the side that faces away from the scan base, or metal tub that holds the components of the drive mechanism).

As illustrated, in one example, the motor 108 is mounted to at least a first planar side of mounting plate 200 (although in some examples, the motor may be mounted within an aperture in the mounting plate 200). The mounting plate 200 is a rigid plate that supports the motor 108, and in one example the mounting plate 200 may be formed of a metal.

As discussed in further detail below, the mounting plate 200 also supports the belt tensioner 112. The mounting plate 200 further supports the pulley 114, a worm 204, and a set of vibration isolators $206_1$-$206_3$ (hereinafter collectively referred to as "vibration isolators 206").

The top view of FIG. 2A shows the first planar side of the mounting plate 200. In one example, the mounting plate 200 has a generally quadrilateral shape with four corners $202_1$-$202_4$ (hereinafter collectively referred to as "corners 202"); however, in other examples, the mounting plate 200 may have a different shape. The mounting plate 200 is connected to a pivot that is located near the corner $202_1$ that is furthest from the pulley 114, as indicated by the rotational arrow 210. Hereinafter, the reference numeral 210 may be used interchangeably to refer to both the pivot point of the mounting plate 200 and to the rotational arrow indicating the pivot point.

In one example, the pulley 114 is positioned near the corner $202_3$ of the mounting plate 200 that is further from the pivot point 210 of the mounting plate 200 (and also closest to the carriage rod 106). As illustrated, the pulley 114 comprises a plurality of teeth 208 positioned around its circumference, like a worm gear. In one example, the worm 204 is positioned alongside the pulley 114, e.g., to the outside of the belt 110, and positioned close enough to the pulley 114 for the coils of the worm 204 to directly engage the teeth 208 of the pulley 114. In one example, one end of the worm 204 is coupled to the vibration isolator $206_2$ that is positioned closest to the pulley 114; the other end of the worm 204 may be coupled to the motor 108. Thus, the motor 108 drives the worm 204, which, in turn, rotates the pulley 114 and causes the belt 110 to rotate.

In one example, each of the vibration isolators 206 is a passive vibration isolation mechanism that is positioned near one corner 202 of the mounting plate 200. For instance, in the illustrated example, one vibration isolator $206_2$ is positioned at the corner $202_3$ near the pulley 214, one vibration isolator $206_1$ is positioned at the corner $202_1$ that is furthest away from the pulley 214, and one vibration isolator $206_3$ is positioned at the corner $202_4$ that is positioned closest to the scan bar 102. In one example, one or more of the vibration isolators 206 may include a rubber pad and a metal a boss (e.g., formed of aluminum or another metal) positioned beneath the rubber pad.

Figure 2B:
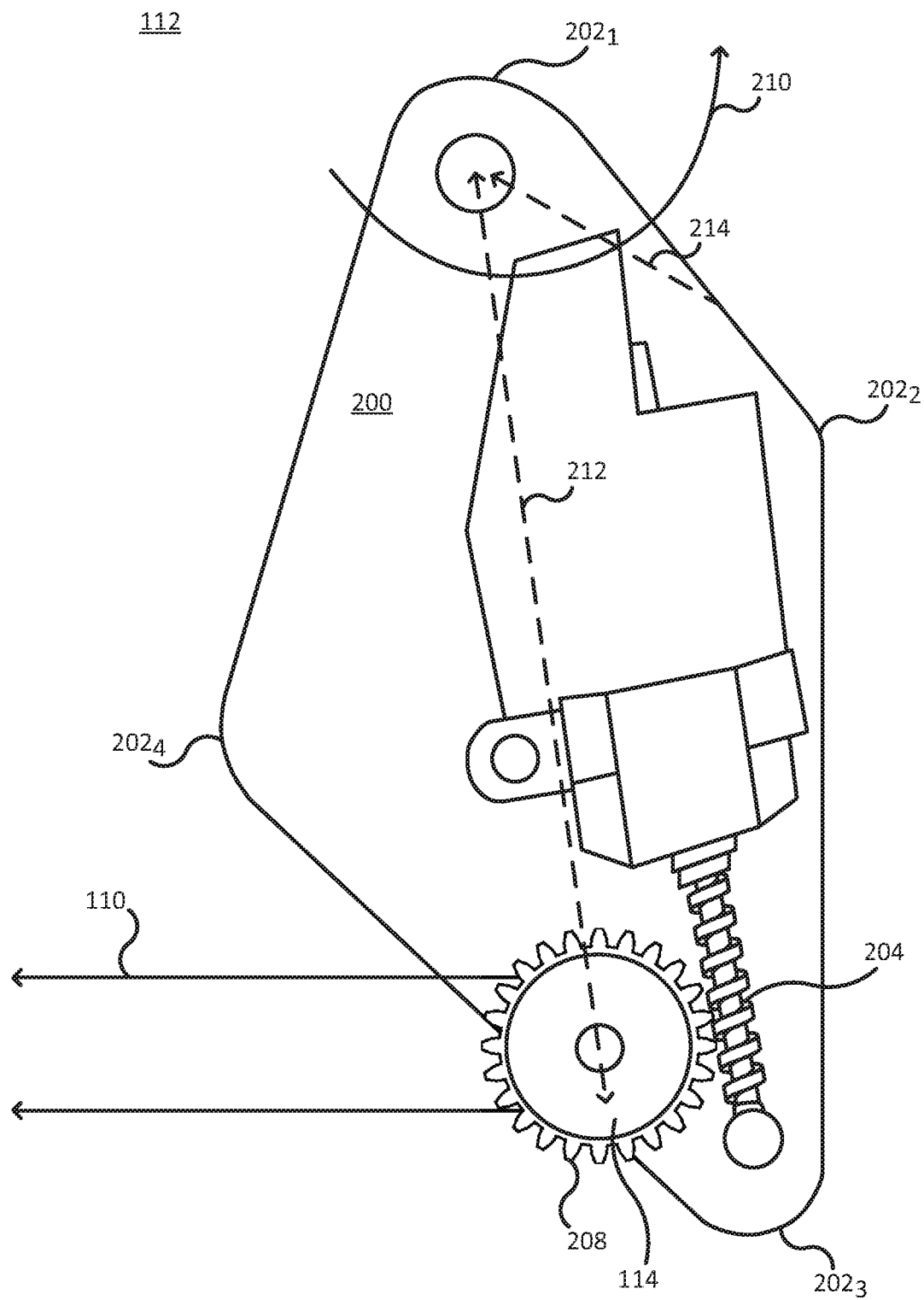
FIG. 2B illustrates a more detailed view of a second example of the motor and assembly of FIG. 1.
Figure 2C:
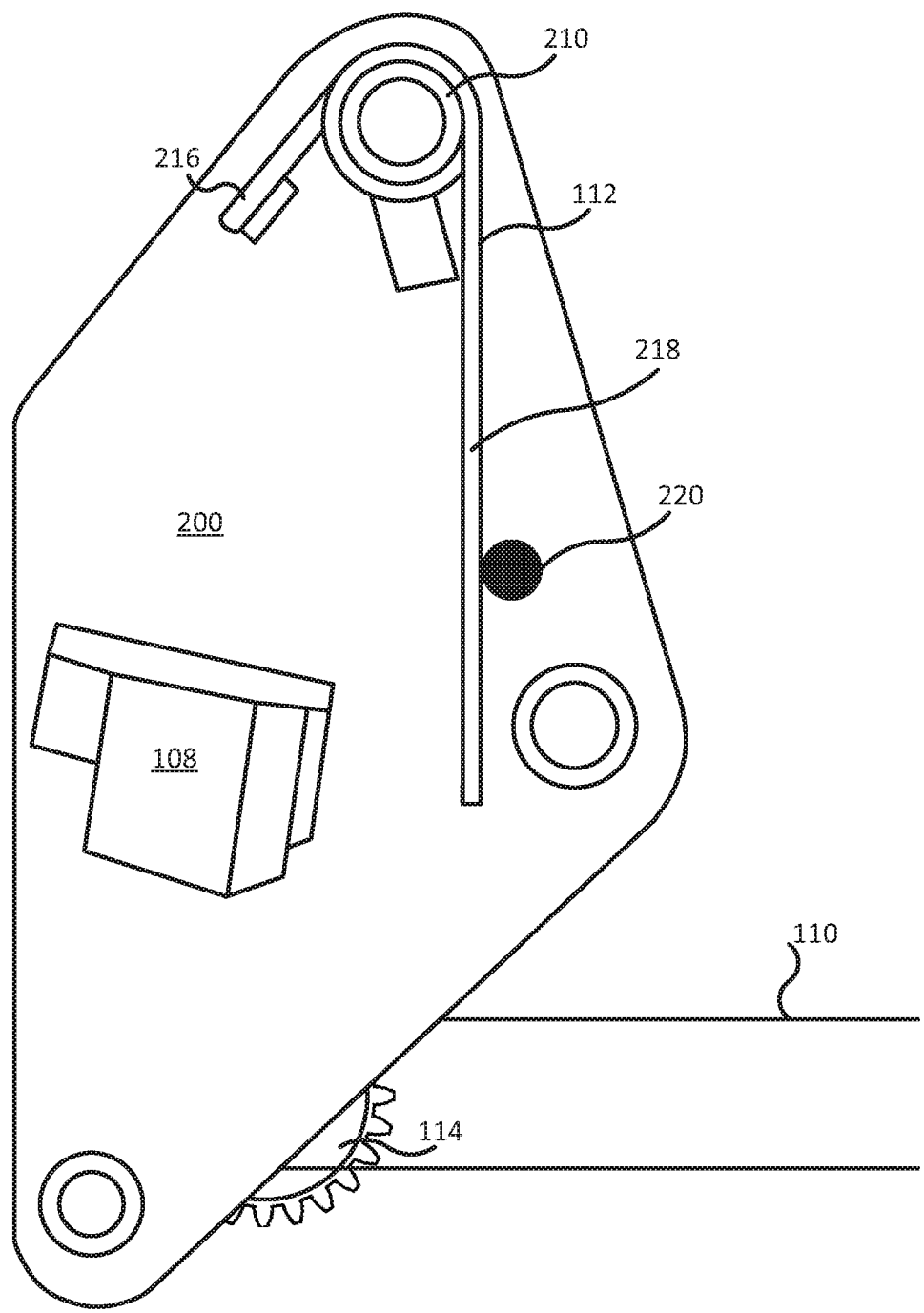
FIG. 2C illustrates a bottom view of the motor and assembly of FIG. 2A-B, wherein the belt tensioner is more clearly visible.

Referring to FIG. 2C, which illustrates a bottom view of the motor 108 and assembly of FIG. 1, in one example, the belt tensioner 112 is mounted to a second planar side of the mounting plate 200 that is opposite the first planar side (i.e., the side of the mounting plate 200 that faces toward the scan base). In one example, the belt tensioner 112 comprises a helical torsional spring that is coiled around the pivot point 210 of the mounting plate 200. The torsional spring comprises a first leg 216 and a second leg 218 that extend, in different directions, from the helical portion of the spring in a plane that is substantially perpendicular to the spring's axis of coil (which may be approximately collinear with the pivot point 210 of the mounting plate 200). In one example, the first leg 216 is shorter than the second leg 218. The first leg 216 may be fixed to the second planar side of the mounting plate 200, while the second leg 218 is not fixed in place but pushes against a boss 220 (e.g., formed of metal) that is mounted to the scan base.

The first leg 216 and the second leg 218 are biased to try to push outward and create a larger angle between themselves. This, in turn, forces the mounting plate 200 to rotate about its pivot point 210 in a direction away from the scan bar 102 (e.g., away from the belt 110). This rotation of the mounting plate 200 pulls the pulley 114 away from the other pulley around which the belt 110 is mounted, thus pulling the belt 110 taut.

In the illustrated example, the mounting plate 200 pivots in a counter-clockwise direction about the pivot point 210 (and about the corner $202_1$) when urged by the force of the motor 108 and/or belt tensioner 112. In one example, the pivot point 210 of the mounting plate 200 is off-center relative to the direction of the belt 110. Spring force is applied by the belt tensioner 112, which, as illustrated, has approximately the same pivot point 210 as the mounting plate 200.

Referring back to FIG. 2A, the belt 110 acts on the mounting plate 200 through a first moment arm 212 that extends from the pulley 114 to the pivot point 210 of the mounting plate 200. By contrast, the belt tensioner 112 acts on the mounting plate 200 through a second moment arm 214 that is shorter than the first moment arm 212. Thus, the tension in the belt 110 is farther away from the pivot point 210 than the force of the belt tensioner 112 is. For instance, in one example, the distance from the belt 110 to the pivot point 210 is four to five times larger than the distance from the belt tensioner 112 to the pivot point 210. Thus, large changes to the position of the belt 110 have minimal effect on the belt tensioner 112, and the tension in the belt 110 remains relatively constant. In one example, the second moment arm 214 extends from the pivot point 210 in a direction away from the scan bar 102, and forms an acute angle with the first moment arm 212. As the belt 110 stretches, the belt tensioner 112 rotates much less.

Because the forces exerted by the belt tensioner 112 and the motor 108 are additive, less force is used to maintain the proper tension on the belt 110. This, in turn, reduces the wear on the motor 108 and the belt 110 and increases the useful life of the scanning device. Moreover, because the motor 108 and the belt tensioner 112 are acting on the belt 110 in substantially the same direction, less noise is produced, making the overall scanning device quieter. In addition, when the belt 110 reaches a high tension stall condition, the belt 110 tightens, reducing the chances of belt skip; thus, the scanning device is less prone to mechanical failures.

The belt tensioning system of the present disclosure may be deployed in duplex scanning devices that are capable of automatically scanning both sides of a two-sided document simultaneously (e.g., using an automatic document feeder (ADF) and stacked scanners having laterally offset scan lines). The relatively compact nature of the belt tensioning system allows it to be deployed without widening the scanner to fit a second scan window; thus, the scanner may be kept to a size that is no wider than the ADF.

FIG. 2B illustrates a more detailed view of a second example of the motor 108 and assembly of FIG. 1. The assembly of FIG. 2B is substantially similar to the assembly of FIG. 2A; however, the assembly of FIG. 2B omits the vibration isolators 206 that are illustrated in FIG. 2A.

Similar to FIG. 2A, in one example, the belt tensioner 112 of FIG. 2B is at least partially mounted to a second planar side of mounting plate 200 (which is not visible in FIG. 2B). All features illustrated in FIG. 2B that share reference numerals with features illustrated in FIG. 2A are configured in similar manners and perform similar functions to the corresponding features described above.

Figure 3:
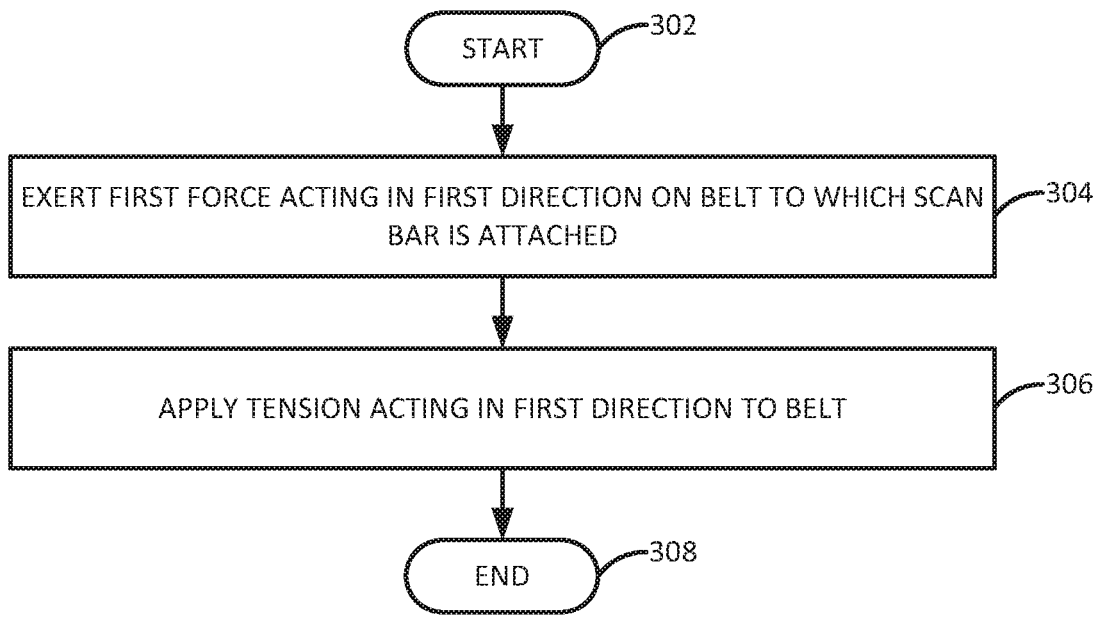
FIG. 3 illustrates a flowchart of an example method for applying tension to a belt of a scanning device.

FIG. 3 illustrates a flowchart of an example method 300 for applying tension to a belt of a scanning device. The method 300 may be performed, for example, using the drive mechanism 100 of FIGS. 1 and 2. As such, non-limiting reference may be made in the discussion of the method 300 to various components of FIGS. 1 and 2.

The method 300 begins in block 302. In block 304, a first force is exerted on a belt to which a scan bar of a printing device is mounted (e.g., belt 110 of FIGS. 1 and 2). The first force acts in a first direction, and may be exerted by urging a set of pulleys (e.g., including pulley 114 of FIGS. 1 and 2) into motion, such that they rotate the belt. The pulleys may be urged into motion by a motor and worm that are located near one of the pulleys, such as a motor and worm that are mounted on a common mounting plate with the one of the pulleys (e.g., motor 108 of FIGS. 1 and 2A-C).

In block 306, tension is applied to the belt in the first direction by a belt tensioner that is located near the motor (e.g., belt tensioner 112 of FIGS. 1 and 2C). Thus, the force exerted in block 304 and the tension applied in block 306 pull the belt in the same direction and may urge the mounting plate to which the motor, pulley, and belt tensioner are mounted to rotate in the same direction (e.g., counter-clockwise) about a pivot point. In one example, the pivot point of the mounting plate is off-center relative to the direction of the belt (e.g., pivot point 210 of FIGS. 2A-C). In one example, the belt tensioner comprises a torsional spring mounted on an opposite side of the mounting plate from the motor and pulley (e.g., the torsional spring of FIG. 2C).

The method 300 ends in block 308.

It will be appreciated that variants of the above-disclosed and other features and functions, or alternatives thereof, may be combined into many other different systems or applications. Various presently unforeseen or unanticipated alternatives, modifications, or variations therein may be subsequently made, which are also intended to be encompassed by the following claims.

What is claimed is:

1. An apparatus, comprising:
   a plate comprising a first planar side that faces away from a scan base of a scanning device and a second planar side that faces towards the scan base of the scanning device, wherein the plate is configured to pivot about a pivot point, wherein the pivot point is located at a first corner of the plate;
   a pulley coupled to a first planar side of the plate and configured to rotate a belt, wherein the pulley is located adjacent to a second corner of the plate, wherein the first corner of the plate and the second corner of the plate are located on opposite ends of the plate;
   a motor coupled to the first planar side of the plate and configured to drive the pulley; and
   a torsional spring coupled to the pivot point at the first corner of the plate on a second planar side of the plate that is opposite the first planar side and configured to apply tension to the belt.

2. The apparatus of claim 1, wherein a distance between the belt and the pivot point is four to five times larger than a distance between the torsional spring and the pivot point.

3. The apparatus of claim 1, wherein the motor and the torsional spring pull the belt in a same direction.

4. The apparatus of claim 1, further comprising:
   a scan bar driven by the belt and housing optics for scanning a document.

5. The apparatus of claim 1, wherein the torsional spring is coiled around the pivot point.

6. The apparatus of claim 1, wherein the pivot point is off-center relative to a direction of the belt.

7. The apparatus of claim 1, further comprising:
   at least one passive vibration isolator mounted to the plate.

8. The apparatus of claim 1, wherein the torsional spring is biased to try to push the plate in a direction away from the belt.

9. A method, comprising:
   exerting a force acting in a first direction on a belt to which a scan bar of a printing device is mounted, to rotate the belt; and
   applying tension in the first direction to the belt, wherein a motor exerting the force via a pulley and a belt tensioner applying the tension are both mounted to a common mounting plate and on opposite sides of the common mounting plate, wherein the mounting plate pivots about a pivot point located at a first corner of the common mounting plate that is off-center relative to a direction of the belt, wherein the pulley is located on a first side of the common mounting plate adjacent to a second corner of the plate that is located on an opposite end of the first corner of the common mounting plate, wherein the belt tensioner is coupled to the pivot point at the first corner on a second side of the common mounting plate, wherein the first side of the common mounting plate faces away from a scan base of a scanning device and the second side faces towards the scan base of the scanning device.

10. An apparatus, comprising:
    a transparent window to support a document to be scanned;
    a scan bar housing optics for scanning the document to be scanned; and
    a drive mechanism for driving the scan bar along a length of the window, the drive mechanism comprising;
    a belt to which the scan bar is mounted;
    a first pulley and a second pulley located to rotate the belt;
    a plate comprising a first side planar side that faces away from the transparent window and a second planar side that faces towards the transparent window, wherein the plate is configured to pivot about a pivot point, wherein the pivot point is located at a first corner of the plate, wherein the first pulley is mounted adjacent to a second corner of the plate on a first planar side of the plate to a first planar side of the plate, wherein the first corner of the plate and the second corner of the plate are located on opposite ends of the plate;
    a motor coupled to the first planar side of the plate and configured to drive the pulley; and
    a torsional spring coupled to the pivot point at the first corner of the plate on a second planar side of the plate that is opposite the first planar side and configured to apply tension to the belt.

* * * * *